3,465,072
METHOD FOR FORMING BIAXIALLY ORIENTED FILM
Razmic S. Gregorian, Silver Spring, Md., assignor to W. R. Grace & Co., New York, N.Y., a corporation of Connecticut
No Drawing. Filed Oct. 20, 1966, Ser. No. 587,957
Int. Cl. B29d 7/02, 7/22, 23/04
U.S. Cl. 264—95    5 Claims

ABSTRACT OF THE DISCLOSURE

A process is provided for forming a heat shrinkable polyethylene film with high shrink tension wherein a tape of the molten polymer is extruded. The tape is then cooled in a bath at a temperature in the range 15–25° C. below the polymers melting point for a period not exceeding 5 seconds. The cooled tape is then immediately biaxially oriented under gaseous pressure and subsequently quenched to room temperature.

---

This invention relates to a method for forming film. More particularly this invention is directed to a method for forming biaxially oriented heat-shrinkable polyolefin film which has not been previously crosslinked by irradiation or chemical treatment.

It is known in the art to form drawn heat-shrinkable polyolefin films such as polyethylene and polypropylene films by various methods. One method is to cold roll the polymer into film form. This method has the drawback of requiring expensive calendering equipment.

Other methods of forming drawn polyolefin film include melt extrusion of a tape followed by immediately expansion of the tape. The shrink tension of the thus formed film is usually extremely low. It is therefore necessary to crosslink this film prior to orientation in order to overcome these drawbacks. While crosslinking adds to the commercial processability, there is the drawback that the additional step of crosslinking the polymer film by irradiation or by chemical means, e.g., organic peroxide crosslinking agents is costly and time consuming. Thus, there has been a long felt need of a method of producing uncrosslinked biaxially oriented film which is readily processible on a commercial basis and which has sufficient elastic memory to meet heat shrinkable standards of commercial acceptability and which has a high shrink tension.

By the term "shrink tension" is meant the force per unit cross section developed by the oriented film as it contracts under restraint after being immersed in a heated water bath. This force is measured by holding a known area of a known thickness film between fixed jaws, and immersing this sample in the bath at a reproducibly rapid speed. Shrink tension is calculated as pounds per square inch (p.s.i.) from the stress recorded by the test equipment and the cross-sectional area of the sample.

One object of this invention is to produce biaxially oriented heat shrinkable polyolefin film which has not been subjected to crosslinking by irradiation or by chemical treatment. Another object of this invention is to provide a means of producing biaxially oriented heat shrinkable film which is easy to use and which is inexpensive and requires no complicated equipment. Other objects will appear from the reading hereinafter.

In summary, this invention comprises a process of biaxially orienting an uncrosslinked polyolefin film to form a heat shrinkable film which comprises: producing a polyolefin tape at a temperature above that of the final melting temperature of said polyolefin, passing said tape into a water bath maintained at a temperature 15–25° C. below that of the final melting temperature of said polyolefin for a time period not exceeding 10 seconds, withdrawing the tape and immediately expanding said tape under gaseous pressure and thereafter quenching said expanded tape to room temperature.

In my invention it is preferable that this process be a continual process so that the polymer is extruded in the melt, passed through the bath at a temperature 15–25° C. below its final melting point, and blown. However, if it is necessary to have the film be cooled down to, say, room temperature for ease of storage, the film must then be reheated above its melt temperature and then passed through the bath as described above and blown in order for this invention to be operable.

After releasing the pressure and cooling the thus oriented polyolefin film to room temperature, the oriented polyolefin film can be shrunk when desired by conventional means, usually by heating to about 90–100° C. in a water bath.

By the term "final melting temperature" is meant the lowest temperature to which a polyolefin must be heated in order to be completely amorphous, i.e., 100% non-crystalline.

The crux of this invention involves the use of a cooling bath held at a temperature preferably 15–25° C. below the final melting point of the polymer, to provide a means to cool the molten film just enough so as to optimize shrink tension in the final drawn film. Moreover, it is imperative that the polymer be cooled in this bath from the melt state, i.e., that the polymer is completely amorphous when placed in the bath. Although I do not wish to be bound by theory, it is my hypothesis that the super-cooled molten polymer has an increased melt viscosity, thereby requiring high pressure to expand it, with a concomitant increase in shrink tension of the blown film. It is well known in that art that the non-crosslinked polymer to be oriented can be heated to a temperature above its melting points and then drawn, but films produced by such drawing have a very low shrink tension.

There is no required medium for the cooling bath, and any fluid medium can be used, provided it does not react or solubilize the film. The preferred medium is water; other media which are eminently suitable are ethylene glycol, silicon oil, fluidized bed media and others.

The biaxial orientation step is performed by expanding the heated polyolefin to be oriented with air pressure, or any other gaseous medium which does not react with the polymer being oriented.

The following examples will aid in explaining but in no way limit the invention.

Throughout this invention the melt indices (MI) were measured under the conditions specified in ASTMD 1238–52T. The density of the polyolefin was measured under the conditions specified in ASTMD 1505–57T.

EXAMPLE 1

A 10 mil thick film of commercially available uncrosslinked polyethylene (density 0.92, melt index=2) was heated by an infrared lamp until it was completely molten. This type of polyethylene has final melting temperature of about 110° C. After the film was molten it was immersed in a water bath held at 88° C., for two seconds. The samples were then blown under air pressure to a thin film. When this uncross-linked biaxially oriented polymer film was dipped in a hot water bath, the area of the film shrank 80% and had a shrink tension of 200 p.s.i. measured on an Instron tester.

EXAMPLE 2

A 10 mil film of the polymer film used in Example 1 was heated above its melting point as in Example 1.

However, it was not immersed in a water bath, but was immediately blown under air pressure. The thus-drawn polymer film shrank 80% when heat shrunk, but had a shrink tension value of 0 p.s.i.

EXAMPLE 3

The polymer used in Examples 1–2 was heated from room temperature to a temperature of about 97° C., and air pressure was applied as in Example 1. The material could not be blown, but ruptured.

EXAMPLES 4–10

The same polymer film used in Example 1 was heated above its final melting point, and passed through water baths at various temperatures for various time duration to illustrate the concept of this invention. Results are tabulated in Table I.

TABLE I

| Example | Water temp. ° (C.) | Time in bath (sec.) | Percent shrink | Shrink tension (p.s.i.) |
|---|---|---|---|---|
| 4 | 95 | 5 | 84 | 210 |
| 5 | 94 | 5 | 89 | 200 |
| 6 | 94 | 10 | Blew and burst | |
| 7 | 91 | 2–5 | 80–82 | 200–220 |
| 8 | 91 | 10 | Blew and burst | |
| 9 | 86 | 5 | 70 | 190 |
| 10 | 80 | 5–10 | Blew and burst | |

EXAMPLE 11

The following example shows a continuous method of forming an uncrosslinked biaxially oriented film.

Commercially available uncrosslinked polyethylene in pellet form having a density of 0.92 and a final melting temperature of 110° C. was fed to the hopper of a 1 inch NRM extruder machine equipped with a shallow screw and a pressure die melt-in crosshead so that extrusion takes place at an angle of about 90° with the axis of the extruder. The temperature in the extruder was maintained at 120 to 130° C. to convey the polymer through a molten state. The molten polymer exited the extruder to a 40 mil circular die. The molten polymer tube was then passed into a water bath maintained by a thermostat at a temperature of 94° C. The super cooled polymer film was then passed through two pairs of spaced nip rolls having trapped there between an air bubble causing the tube to expand, thus biaxially orienting the polymer. The positioning of the pairs of nip rolls were such that the temperature of the polymer was maintained on passage between the first and second pair of nip rolls. The distance between the two sets of nip rolls and the amount of expansion could be varied to obtain the desired amount of biaxial orientation of the polymer film being processed. Obviously the greater the expansion the greater the orientation imparts to the polymer being processed. After passage through the second pair of nip rolls the polyethylene film tubing was flattened in the expanded state. The expanded biaxially oriented polyethylene film tubing was then slit on opposite sides to form two sheets of film in a horizontal frame. One sheet of polyethylene film was collected on a take-up roll situated above the point of operation and the other was collected on a take-up roll positioned below the plane of operation.

The biaxially oriented polyethylene film had a thickness of 1.5 mils. When heat-shrunk, the polymer had a percent shrink of 85%, and a shrink tension of 230 p.s.i.

It is clear that although this case is described using low-density polyethylene as examples, high density polyethylene and polypropylene are also applicable to my inventive process, with modifications of the temperatures and time of the bath as would be required by the higher melting points of the polymers.

It is also clear that the temperature of the bath can be much lower than the limits preferred in the specification; for example, if the polymer tape is at a temperature much higher than its melting point the bath temperature can obviously be decreased to keep the treatment time constant.

Included within the scope of this invention is the addition of fillers, plasticizers, antioxidants, antistatic agents, dyed and pigments to the polyolefin to be oriented prior to the orientation step.

The oriented polyolefin film product has many and varied uses including the wrapping of food and other articles.

What is claimed is:
1. A process of biaxially orienting an uncrosslinked low density polyethylene tape to form a heat shrinkable film with high shrink tension which comprises:
 (a) producing said tape at a temperature above that of the final melting point of the polymer,
 (b) passing the tape into a water bath maintained at a temperature 15–25° C. below that of the final melting point of said polymer, for a time period not exceeding 5 seconds,
 (c) withdrawing the tape from the bath, and
 (d) immediately expanding said tape under gaseous pressure and thereafter quenching said film to room temperature.
2. The process as described in claim 1 in which the polyethylene has a final melting temperature of 110° C.
3. The process as described in claim 2 in which the water bath is maintained at a temperature of 85–95° C.
4. The process as described in claim 3 in which the time period is between 2 and 5 seconds.
5. The process as described in claim 4 in which the shrink tension of the oriented film is between 190 and 220 p.s.i.

References Cited

UNITED STATES PATENTS

| 2,452,080 | 10/1948 | Stephenson | 264—95 X |
| 2,979,777 | 4/1961 | Goldman. | |
| 3,022,543 | 2/1962 | Baird et al. | 264—95 X |
| 3,090,998 | 5/1963 | Heisterkamp et al. | 264—95 |
| 3,193,547 | 7/1965 | Schott | 264—95 |
| 3,337,663 | 8/1967 | Taga | 264—95 X |

ROBERT F. WHITE, Primary Examiner

J. H. SILBAUGH, Assistant Examiner

U.S. Cl. X.R.

264—210